United States Patent
Chen et al.

(10) Patent No.: US 12,278,484 B2
(45) Date of Patent: Apr. 15, 2025

(54) BYPASS SEAMLESS SWITCHING APPARATUS AND METHOD THEREOF

(71) Applicant: Industrial Technology Research Institute, Hsinchu (TW)

(72) Inventors: Po-Li Chen, Hsinchu (TW); Shu-Syuan Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 178 days.

(21) Appl. No.: 18/347,914

(22) Filed: Jul. 6, 2023

(65) Prior Publication Data

US 2024/0097435 A1    Mar. 21, 2024

(30) Foreign Application Priority Data

Sep. 19, 2022  (TW) .................................. 111135384
Apr. 24, 2023  (TW) .................................. 112115218

(51) Int. Cl.
   *H02H 9/04*       (2006.01)
(52) U.S. Cl.
   CPC ..................... *H02H 9/04* (2013.01)
(58) Field of Classification Search
   CPC .... H02H 9/04; H02H 3/05; H02H 3/20; H02J 9/061

(Continued)

(56) References Cited

U.S. PATENT DOCUMENTS 7,102,334 B2    9/2006  Wiegand et al.
8,847,605 B2 *  9/2014  Morita .................... G01R 31/66
                                                    702/58

(Continued)

FOREIGN PATENT DOCUMENTS

CN    101621254 B    5/2012
CN    105633978 A    6/2016

(Continued)

OTHER PUBLICATIONS

An Office Action issued by Taiwan Intellectual Property Office on Sep. 7, 2023, which corresponds to Taiwanese Patent Application No. 111135384 and is related to U.S. Appl. No. 18/347,914.

(Continued)

*Primary Examiner* — Dharti H Patel
(74) *Attorney, Agent, or Firm* — Studebaker Brackett PLLC

(57) ABSTRACT

A bypass seamless switching apparatus and a method thereof are provided, in which a controller sends a first control signal to control or switch a first relay to on/off state, sends a second control signal to control or switch a second relay to on/off state, and sends a switch signal to control or switch a bypass switch module to on/off state. When the controller is in failure mode or is disconnected, a driving power supply of a bypass circuit provides a driving signal to the bypass switch module to maintain or switch a switch of the bypass switch module to on state, so that the bypass switch module is in short-circuit state or short-circuit protection state, and a bypass side voltage of the bypass switch module is equal to or close to zero voltage, so as to execute bypass function or bypass seamless switching function of the bypass switch module.

20 Claims, 9 Drawing Sheets

(58) Field of Classification Search
USPC .................................................... 361/91.1
See application file for complete search history.

(56) References Cited

U.S. PATENT DOCUMENTS

| | | | | |
|---|---|---|---|---|
| 10,700,597 | B1* | 6/2020 | Eckhardt | H02J 3/1814 |
| 11,264,794 | B2* | 3/2022 | Pan | H01H 71/24 |
| 2009/0087178 | A1* | 4/2009 | Winegard | H04L 9/00 398/2 |
| 2010/0134934 | A1* | 6/2010 | Matsubara | F02N 11/087 361/49 |
| 2010/0201338 | A1 | 8/2010 | Haj-Maharsi et al. | |
| 2018/0062426 | A1* | 3/2018 | Kha | H02J 9/061 |
| 2020/0013546 | A1 | 1/2020 | Divan et al. | |
| 2021/0288593 | A1 | 9/2021 | Burkes et al. | |

FOREIGN PATENT DOCUMENTS

| | | | | |
|---|---|---|---|---|
| CN | 105977989 | A | | 9/2016 |
| CN | 210927106 | U | | 7/2020 |
| CN | 112072684 | A | | 12/2020 |
| CN | 112152261 | A | | 12/2020 |
| CN | 213072120 | U | | 4/2021 |
| JP | 2005149843 | A | * 6/2005 | .......... G01R 31/327 |
| TW | 200625756 | A | | 7/2006 |
| TW | 201911729 | A | | 3/2019 |
| TW | 201926880 | A | | 7/2019 |
| TW | 202123590 | A | | 6/2021 |

OTHER PUBLICATIONS

Rupert Power et al., "A Hybrid Transformer Topology for Distribution Network Voltage Regulation"; 2021 IEEE Southern Power Electronics Conference (SPEC); Dec. 6-9, 2021; Kigali, Rwanda; DOI: 10.1109/SPEC52827.2021.9709487; pp. 1-6.

Hyun-Jun Lee et al., "Hybrid Distribution Transformer Based on an Existing Distribution Transformer and a Series-Connected Power Converter"; IEEE Transactions on Power Delivery; vol. 37, No. 5; Oct. 2022; DOI: 10.1109/TPWRD.2022.3147820; pp. 1-10.

Liran Zheng et al., "Solid-State Transformer and Hybrid Transformer with Integrated Energy Storage in Active Distribution Grids: Technical and Economic Comparison, Dispatch, and Control"; IEEE Journal of Emerging and Selected Topics in Power Electronics; vol. 10, No. 4; Aug. 2022; DOI: 10.1109/JESTPE.2022.3144361; pp. 1-17.

Jacek Kaniewski et al., "The Study of Smart Distribution Transformer Based on a Bipolar Matrix Chopper"; 2017 IEEE International Conference on Compatibility, Power Electronics and Power Engineering (CPE-POWERENG); Apr. 4-6, 2017; Cadiz, Spain; DOI: 10.1109/CPE.2017.7915183; pp. 282-287.

* cited by examiner

BYPASS SEAMLESS SWITCHING APPARATUS AND METHOD THEREOF

BACKGROUND

1. Technical Field

The present disclosure relates to a bypass switching technology, and more particularly, to a bypass seamless switching apparatus and method thereof that transfers another switching strategy or energy transfer path when the controller (system) is in failure mode/disconnection (such as failure/maintenance).

2. Description of Related Art

Bypass circuits are often used in various apparatuses or systems such as hybrid transformers, power electronic modules, electronic switches, series compensation systems, power systems, or power transmission and distribution systems, and bypass circuits must keep various apparatuses or systems from being open circuits. However, in the general technology, the characteristics of the bypass circuit in various apparatuses or systems require a controller to achieve the requirement of the bypass function. Also, when the system fails and is without the design of the bypass switching mode, it will cause the voltage distortion of the user load at the back end, thereby affecting the voltage quality of the user load.

In the general technology, a series compensation system based on an electronic switch is provided, which includes a bypass circuit breaker connected in series on the transmission line, a controller, and a series compensation device connected to both ends of the bypass circuit breaker. The series compensation device includes two variable capacitor banks and one electronic switch, where both ends of each variable capacitor bank are connected with a bypass circuit breaker, so that the variable series capacitance compensation is used to compensate the voltage on the transmission line to reduce the phenomenon of unstable voltage swell/sag of the line voltage, and the variable capacitor banks will be bypassed to reduce the impact in case of failure.

However, a controller is required in the general technology to achieve the requirement of the bypass function, and also the bypass circuit breaker cannot operate automatically to provide a protection without the controller. At the same time, the controller is not easy to replace when it fails, and the controller does not have a certain hot-swap capability.

Therefore, how to provide an innovative bypass switching technology to solve any of the above problems or provide related apparatuses/methods has become a major research topic for those skilled in the art.

SUMMARY

The bypass seamless switching apparatus of the present disclosure comprises: a controller; and a bypass circuit electrically connected to the controller and having a first driving power supply, a first relay, a second relay and a bypass switch module, wherein the first driving power supply is electrically connected to the first relay and the bypass switch module respectively, and the second relay is electrically connected to the bypass switch module, so that the controller sends a first control signal to control or switch a switch of the first relay to on state or off state, the controller sends a second control signal to control or switch a switch of the second relay to on state or off state, and the controller sends a switch signal to control or switch a switch of the bypass switch module to on state or off state; wherein the first driving power supply of the bypass circuit provides a driving signal to the bypass switch module to maintain or switch the switch of the bypass switch module to on state when the controller is in a failure mode or disconnects a connection relation/connection line between the controller and the bypass circuit, so that the bypass switch module is in a short-circuit state or a short-circuit protection state, and a bypass side voltage of the bypass switch module is equal to or close to zero voltage to turn on or execute a bypass function or a bypass seamless switching function of the bypass switch module.

The method of bypass seamless switching of the present disclosure comprises: providing a bypass seamless switching apparatus comprising a controller and a bypass circuit electrically connected to each other, wherein the bypass circuit has a first driving power supply, a first relay, a second relay and a bypass switch module, wherein the first driving power supply is electrically connected to the first relay and the bypass switch module respectively, and the second relay is electrically connected to the bypass switch module, so that the controller sends a first control signal to control or switch a switch of the first relay to on state or off state, the controller sends a second control signal to control or switch a switch of the second relay to on state or off state, and the controller sends a switch signal to control or switch a switch of the bypass switch module to on state or off state; and providing, by the first driving power supply of the bypass circuit, a driving signal to the bypass switch module to maintain or switch the switch of the bypass switch module to on state when the controller is in a failure mode or disconnects a connection relation/connection line between the controller and the bypass circuit, so that the bypass switch module is in a short-circuit state or a short-circuit protection state, and a bypass side voltage of the bypass switch module is equal to or close to zero voltage to turn on or execute a bypass function or a bypass seamless switching function of the bypass switch module.

Therefore, the present disclosure provides an innovative bypass seamless switching apparatus and method thereof, which can enable the bypass switch module to automatically operate a protection without a controller (such as when the controller is in a failure mode or the connection relation/connection line between the controller and the bypass circuit is disconnected), so that the controller can be conveniently replaced and has a certain hot-swap capability.

Moreover, the controller of the present disclosure can send the first control signal to effectively control or switch the switch of the first relay to on state or off state, and can send the second control signal to effectively control or switch the second relay to on state or off state, and can also send a switch signal to effectively control or switch the switch of the bypass switch module to on state or off state.

Furthermore, when the controller of the present disclosure is in a failure mode or disconnects the connection relation/connection line between the controller and the bypass circuit, the first driving power supply of the bypass circuit can still continuously provide a driving signal to the bypass switch module to drive the switch of the bypass switch module to keep in on state, so that the bypass switch module is in a short-circuit state or a short-circuit protection state, and the bypass side voltage of the bypass switch module is equal to or close to zero voltage, so that the bypass function or the bypass seamless switching function of the bypass switch module can be achieved and the controller connected to the bypass circuit can be replaced or hot-swapped.

In order to make the above-mentioned features and advantages of the present disclosure more comprehensible, the following specific embodiments are described in detail together with the accompanying drawings. Additional features and advantages of the present disclosure will be set forth in the description which follows, and in part will be learned from the description, or may be learned by practice of the present disclosure. It is to be understood that both the foregoing general description and the following detailed description are exemplary and explanatory in nature but not intended to limit the claimed scope of the present disclosure.

DETAILED DESCRIPTION

Implementations of the present disclosure are described below by embodiments. Other advantages and technical effects of the present disclosure can be readily understood by one of ordinary skill in the art upon reading the disclosure of this specification, which can also be implemented or used by other different specific equivalent implementation forms.

Figure 1A:
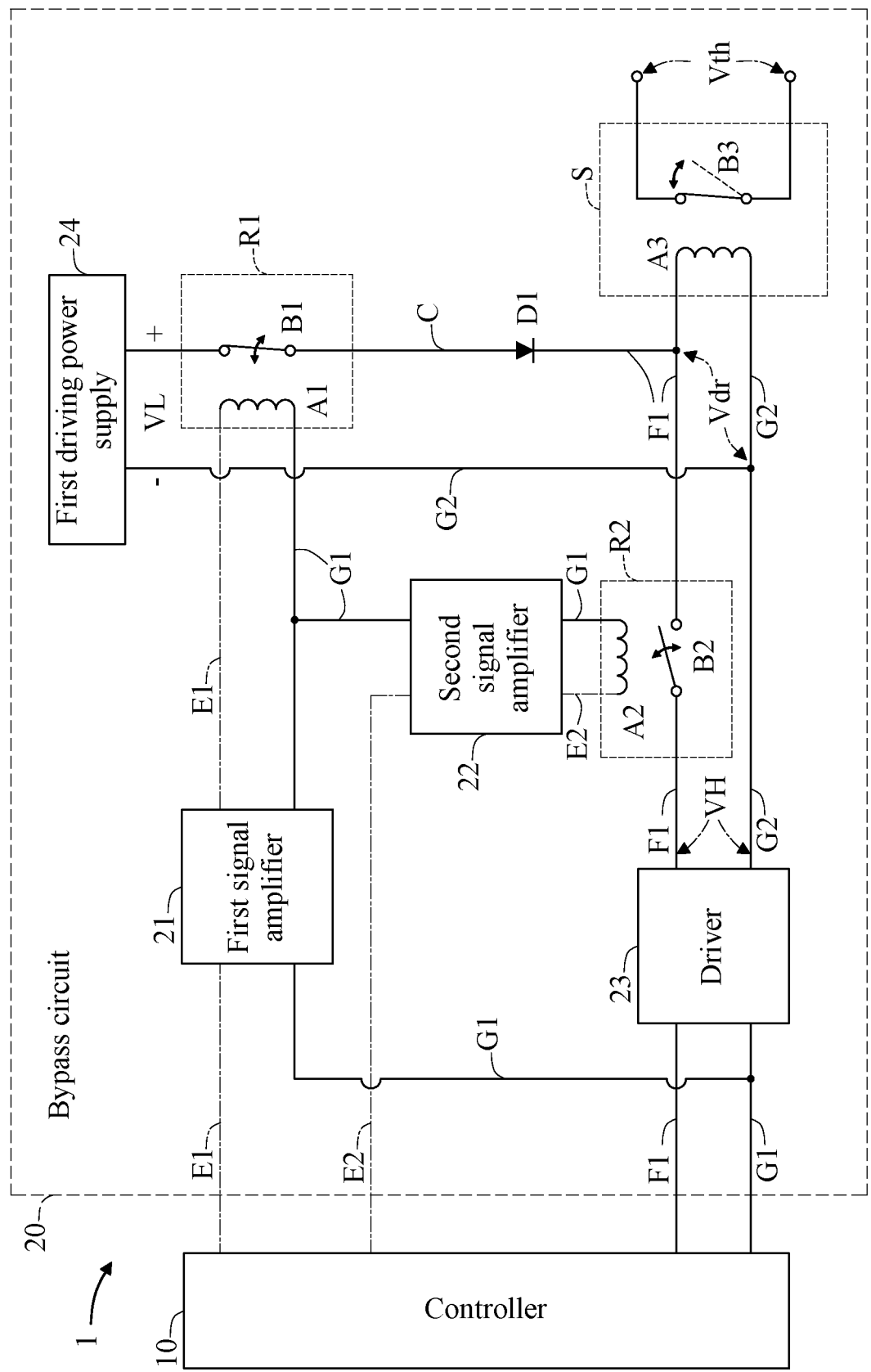
FIG. 1A to FIG. 1B are schematic diagrams of the circuit structure of the first embodiment of the bypass seamless switching apparatus according to the present disclosure, wherein the controller in FIG. 1A is in the control mode, and the controller in FIG. 1B is in the failure mode.
Figure 1B:
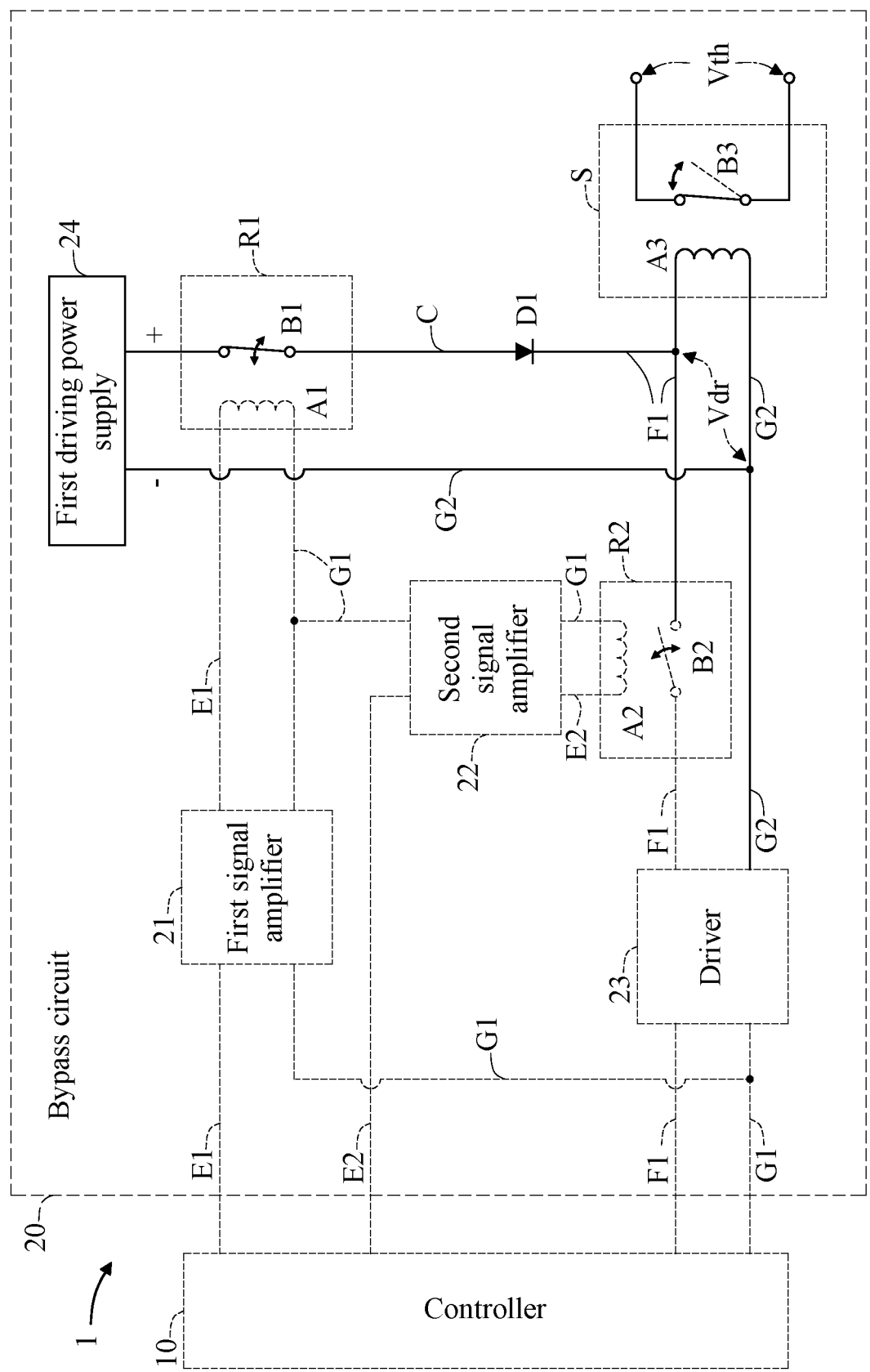

FIG. 1A to FIG. 1B are schematic diagrams of the circuit structure of the first embodiment of the bypass seamless switching apparatus 1 according to the present disclosure, wherein the controller 10 in FIG. 1A is in the control mode (such as connecting the controller 10 to the bypass circuit 20), while the controller 10 in FIG. 1B is in failure mode (such as disconnecting the connection relation/connection line between the controller 10 and the bypass circuit 20).

As shown in FIG. 1A to FIG. 1B, the bypass seamless switching apparatus 1 may comprise the controller 10 and the bypass circuit 20 electrically connected to each other, and the bypass circuit 20 may have a first signal amplifier 21, a second signal amplifier 22, a driver 23, a first driving power supply 24, a first diode D1, a first relay R1, a second relay R2 and a bypass switch module S, etc. electrically connected to each other.

In one embodiment, the controller 10 can be a microcontroller unit (MCU), a control module, a control chip, a control element, etc., the first control signal E1 or the second control signal E2 of the controller 10 can be digital control signals composed of bits "0" or "1," etc., and the first switch signal F1 or the second switch signal F2 (see FIG. 4 to FIG. 5) of the controller 10 can be a toggle switch signal, a mixed toggle switch signal, a pulse width modulation (PWM) signal, a driving signal, etc. The bypass circuit 20 can be a bypass switching circuit, a bypass seamless switching circuit, etc., the first signal amplifier 21 or the second signal amplifier 22 can be a signal amplifying chip, a signal amplifying element, etc., the driver 23 can be a driving chip, a driving element etc., and the first driving power supply 24 or the second driving power supply 25 (see FIG. 5) can be a direct current (DC) driving power supply, etc. The first relay R1 may be a normally closed relay composed of the coil A1 and the switch B1, and the second relay R2 may be a normally open relay composed of the coil A2 and the switch B2. The bypass switch module S can be a relay composed of a coil A3 and a switch B3 (see FIG. 1A), or a bypass bidirectional switch or a high-frequency switching element composed of a first toggle switch S1 and a second toggle switch S2 (see FIG. 4 to FIG. 5).

In one embodiment, "at least one" in the present disclosure represents one or more (such as one, two, three or more), "plurality" represents two or more (such as two, three, four, ten or more), and "electrically connect" represents electrical connection or coupling, etc. "Bypass seamless" represents that the bypass switch module S or switch thereof is in on state, short-circuit state, or short-circuit protection state, and the bypass side voltage Vth of the bypass switch module S is equal to or close to zero voltage (0 V). However, the present disclosure is not limited to those mentioned in each embodiment.

As shown in FIG. 1A to FIG. 1B, the controller 10 can be electrically connected to the first signal amplifier 21, the second signal amplifier 22 and the driver 23. The first signal amplifier 21 can be electrically connected to the coil A1 of the first relay R1 (such as a normally closed relay), the second signal amplifier 22 can be electrically connected to the coil A2 of the second relay R2 (such as a normally open relay), and the driver 23 can be electrically connected to the switch B2 of the second relay R2 and the bypass switch module S (such as the coil A3 of the relay). The first driving power supply 24 can be electrically connected to the driver 23, the switch B1 of the first relay R1 and the bypass switch module S (such as the coil A3 of the relay), the switch B1 of the first relay R1 can be electrically connected to the anode of the first diode D1, and the cathode of the first diode D1 can be electrically connected to the switch B2 of the second relay R2 and the bypass switch module S (such as the coil A3 of the relay).

In detail, the controller 10 can be electrically or communicatively connected to the bypass circuit 20 via a plurality of lines/circuits or signals. For example, when the controller 10 is in the control mode or connected to the bypass circuit 20, [1] the controller 10 can be sequentially electrically or communicatively connected to the first signal amplifier 21 of the bypass circuit 20 and one end of the coil A1 of the first relay R1 (such as a normally closed relay) via the first control line or the first control signal E1, so as to amplify the first control signal E1 of the controller 10 by the first signal amplifier 21, and then use the amplified first control signal E1 to control or switch the switch B1 of the first relay R1 to on/conduction state or off/disconnection state. [2] The controller 10 can be sequentially electrically or communicatively connected to the second signal amplifier 22 of the bypass circuit 20 and one end of the coil A2 of the second relay R2 (such as a normally open relay) via the second control line or the second control signal E2, so as to amplify the second control signal E2 of the controller 10 by the second signal amplifier 22, and then use the amplified second control signal E2 to control or switch the switch B2 of the second relay R2 to on state or off state. [3] The controller 10 can be sequentially communicatively connected to one end of the driver 23 of the bypass circuit 20, the switch B2 of the second relay R2, and the bypass switch module S (such as one end of the coil A3 of the relay) via the first switch signal F1, so as to amplify the first switch signal F1 of the controller 10 by the driver 23, and then use the amplified first switch signal F1 to control or switch the switch B3 of the bypass switch module S to on state or off state.

The controller 10 can be electrically connected to a ground terminal of the first signal amplifier 21 and a ground terminal of the driver 23 via a first ground line G1, the first signal amplifier 21 can be electrically connected to a ground terminal of the coil A1 of the first relay R1 (such as a normally closed relay) via the first ground line G1, the second signal amplifier 22 can be electrically connected to a ground terminal of the coil A2 of the second relay R2 (such as a normally open relay) via the second ground line G2, and the other ground terminal of the driver 23 can be electrically connected to the bypass switch module S (such as the ground terminal of the coil A3 of the relay) via the second ground line G2.

The first driving power supply 24 can provide a driving signal C (such as a DC voltage driving signal) to the bypass switch module S. A positive terminal (+) of the first driving power supply 24 can be electrically connected to the switch B1 of the first relay R1 (such as a normally closed relay), and the negative terminal (−) of the first driving power supply 24 can be electrically connected to the ground terminal of the driver 23 and the bypass switch module S (such as the ground terminal of the coil A3 of the relay) via the second ground line G2. The switch B1 of the first relay R1 can be electrically connected to the anode of the first diode D1, and the cathode of the first diode D1 can be electrically connected to the switch B2 of the second relay R2 (such as a normally open relay) and the bypass switch module S (such as one end of the coil A3 of the relay).

As shown in FIG. 1A, when the controller 10 is in the control mode or when the controller 10 is connected to the bypass circuit 20, for example, the controller 10 has been connected to the bypass circuit 20 and the controller 10 is normally operating/controlling the bypass circuit 20, so that the controller 10 can send a first control signal E1 (such as a first digital control signal) to control or switch the first relay R1 (such as a normally closed relay) of the bypass circuit 20 to on state or off state, the controller 10 can also send a second control signal E2 (such as a second digital control signal) to control or switch the second relay R2 (such as a normally open relay) of the bypass circuit 20 to on state or off state, and the controller 10 can also send the first switch signal F1 (such as the driving signal/toggle switch signal) to drive or switch the bypass switch module S to on state or off state via the driver 23 of the bypass circuit 20, so that the bypass function or the bypass seamless switching function of the bypass switch module S is turned on or off.

As shown in FIG. 1B, when the controller 10 is in failure mode or disconnects the connection relation/connection line between the controller 10 and the bypass circuit 20, for example, [1] the controller 10 is abnormal (faulty) and cannot operate normally, [2] the connection line between the controller 10 and the bypass circuit 20 is disconnected, or [3] the controller 10 is replaced/hot-swapped, etc., the first driving power supply 24 (such as a DC driving power supply) of the bypass circuit 20 can continuously provide a driving signal C (such as a DC voltage driving signal) to the bypass switch module S to drive the switch B3 of the bypass switch module S to keep in on state, so that the bypass switch module S is in a short-circuit state or a short-circuit protection state, and the bypass side voltage Vth of the bypass switch module S (such as the voltage at both ends of the switch B3 of the relay) is equal to or close to zero voltage (such as 0 V or the voltage at both ends of the switch B3 in on state), so as to turn on or execute the bypass function or the bypass seamless switching function of the bypass switch module S.

Figure 2:
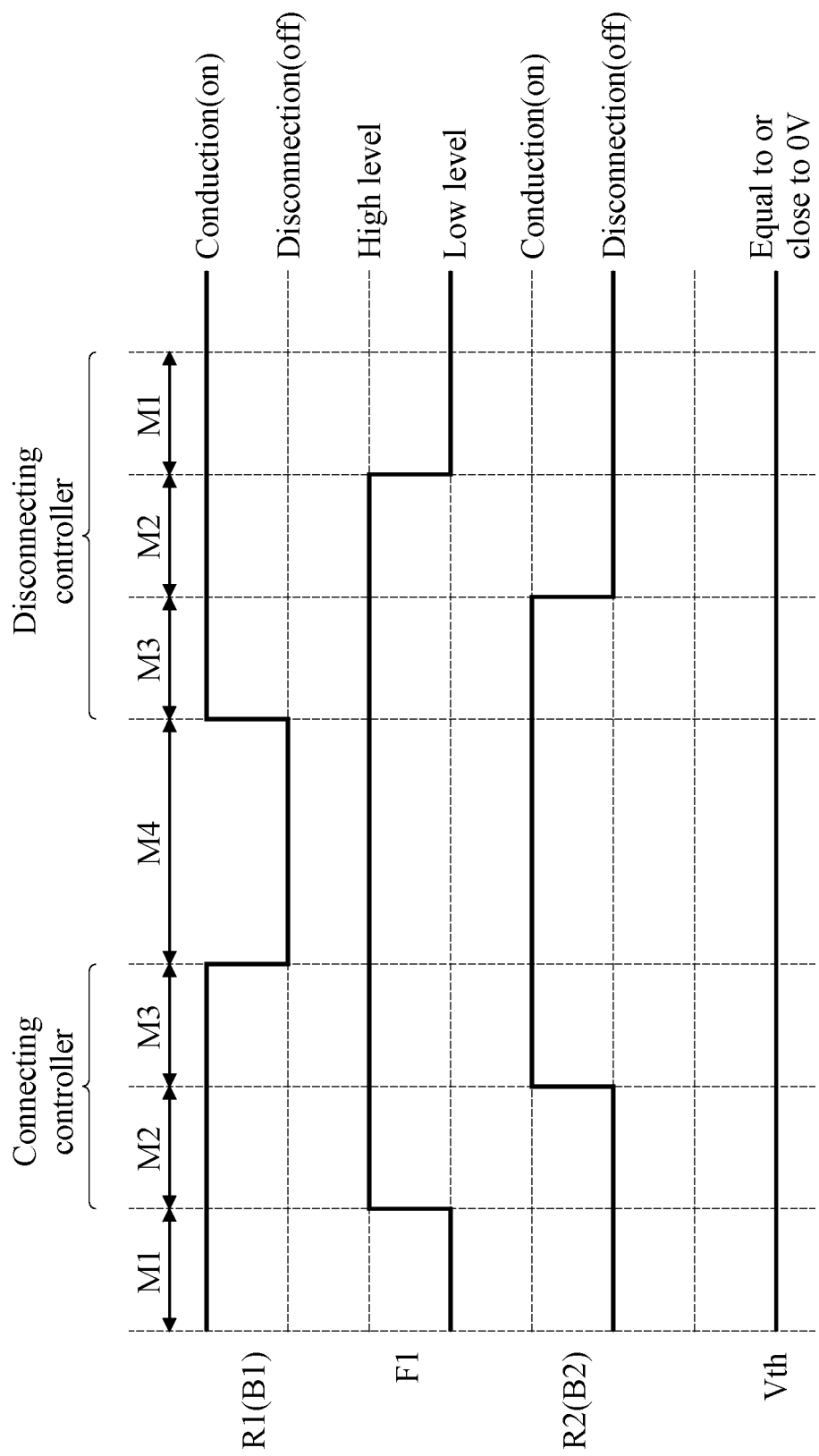
FIG. 2 is a schematic diagram of the waveforms of the first relay, switch signal, second relay and bypass side voltage when the controller is connected and disconnected respectively in the bypass seamless switching apparatus and method thereof according to the present disclosure.

FIG. 2 is a schematic diagram of the waveforms of the first relay R1 (switch B1), the first switch signal F1, the second relay (switch B2) and the bypass side voltage Vth when the controller 10 is connected and disconnected respectively in the bypass seamless switching apparatus 1 and method thereof according to the present disclosure, and FIG. 2 is illustrated with reference to FIG. 1A to FIG. 1B.

As shown in FIG. 2, when the controller 10 is in failure mode (such as the controller fails) or disconnects the connection relation/connection line between the controller 10 and the bypass circuit 20 (such as replacing/hot-swapping the controller 10), the switch B1 of the first relay R1 (such as a normally closed relay) returns to on state, and the switch B2 of the second relay R2 (such as a normally open relay) jumps to off state, and the first driving power supply 24 provides the driving signal C (such as a DC voltage driving signal) to the bypass switch module S, the bypass switch module S can still keep in the short-circuit state or the short-circuit protection state, and the bypass side voltage Vth of the bypass switch module S (such as the voltage at both ends of the switch B3 of the relay) has been kept equal to or close to zero voltage (0 V), so that the bypass switch module S can achieve the bypass function or the bypass seamless switching function.

Therefore, with reasonable/appropriate arrangement of the first driving power supply 24, the normally closed contact of the switch B1 of the first relay R1, and the normally open contact of the switch B2 of the second relay R2, etc. in the present disclosure, the bypass switch module S can be effectively kept in the short-circuit state or the short-circuit protection state without the controller 10 (such as replacing/hot-swapping the controller 10).

In other words, when the controller 10 is in the control mode or when the controller is connected to the bypass circuit 20, the bypass seamless switching apparatus 1 can execute the technical content of the following procedure [2] to procedure [4] in sequence, and also the technical content of the following procedure [1] can be performed before the procedure [2].

[1] As shown in the waveform diagram on the left side of FIG. 2, during the "initial mode M1" of the bypass seamless switching apparatus 1, the controller 10 has not been connected (exactly/properly connected) to the bypass circuit 20, at this moment the switch B1 of the first relay R1 (such as a normally closed relay) remains in on state, and the switch B2 of the second relay R2 (such as a normally open relay) remains in off state, so that the driving signal C of the first driving power supply 24 drives or controls the coil A3 and the switch B3 of the bypass switch module S (such as a relay).

[2] As shown in the waveform diagram of "connecting the controller 10" in FIG. 2, during the "first control mode M2" of the bypass seamless switching apparatus 1, the controller has been connected (exactly connected) to the bypass circuit 20, at this moment, the first switch signal F1 and the first control signal E1 of the controller 10 are ready and at the high level, and the switch B1 of the first relay R1 (such as a normally closed relay) remains in on state, while the switch B2 of the second relay R2 (such as a normally open relay) remains in off state, so that the driving signal C of the first driving power supply 24 can continuously drive or control the coil A3 and the switch B3 of the bypass switch module S (such as a relay).

[3] As shown in the waveform diagram of "connecting controller 10" in FIG. 2, during the "second control mode M3" of the bypass seamless switching apparatus 1, the controller 10 has been connected (exactly connected) to the bypass circuit 20, at this moment, the switch B1 of the first relay R1 (such as a normally closed relay) remains in on state, and the second control signal E2 of the controller 10 switches the switch B2 of the second relay R2 (such as a normally open relay) from off state to on state, so that the coil A3 and the switch B3 of the bypass switch module S (such as a relay) are driven or controlled by the first switch signal F1 of the controller 10.

[4] As shown in the waveform diagram in FIG. 2, during the "bypass mode M4" of the bypass seamless switching apparatus 1, the controller 10 has been connected (exactly connected) to the bypass circuit 20, and the first control signal E1 of the controller 10 switches the switch B1 of the first relay R1 (such as a normally closed relay) from on state to off state, and the second control signal E2 of the controller 10 keeps the switch B2 of the second relay R2 (such as a normally open relay) in on state, so that the coil A3 and the switch B3 of the bypass switch module S (such as a relay) are continuously driven or controlled by the first switch signal F1 of the controller 10.

On the other hand, when the controller 10 is in the failure mode or disconnects the connection relation/connection line between the controller 10 and the bypass circuit 20 (such as a failure or replacement of the controller 10), the bypass seamless switching apparatus 1 can execute the technical content of the following procedure [1] to procedure [3] in sequence, that is, after the above bypass mode M4, reversely execute the second control mode M3→the first control mode M2→the initial mode M1 in sequence.

[1] As shown in the waveform diagram of "disconnecting controller 10" in FIG. 2, during the "second control mode M3" of the bypass seamless switching apparatus 1, the controller 10 is still connected (exactly connected) to the bypass circuit 20, at this moment, the switch B1 of the first relay R1 (such as a normally closed relay) keeps in on state, and the second control signal E2 of the controller 10 keeps the switch B2 of the second relay R2 (such as a normally open relay) in on state, so that the coil A3 and the switch B3 of the bypass switch module S (such as a relay) are continuously driven or controlled by the first switch signal F1 of the controller 10.

[2] As shown in the waveform diagram of "disconnecting controller 10" in FIG. 2, during the "first control mode M2" of the bypass seamless switching apparatus 1, the controller is still connected (exactly connected) to the bypass circuit 20, at this moment, the first switch signal F1 and the first control signal E1 of the controller 10 are at a high level, the switch B1 of the first relay R1 (such as a normally closed relay) keeps in on state, and the switch B2 of the second relay R2 (such as a normally open relay) is switched from on state to off state, so as to drive or control the coil A3 and the switch B3 of the bypass switch module S (such as a relay) by the driving signal C of the first driving power supply 24.

[3] As shown in the waveform diagram of "disconnecting controller 10" in FIG. 2, during the "initial mode M1" of the bypass seamless switching apparatus 1, the controller 10 has been disconnected and not connected (exactly connected) to the bypass circuit 20, at this moment, the switch B1 of the first relay R1 (such as a normally closed relay) keeps in on state, and the switch B2 of the second relay R2 (such as a normally open relay) keeps in off state, so as to continuously drive or control the coil A3 and the switch B3 of the bypass switch module S (such as a relay) by the driving signal C of the first driving power supply 24.

Therefore, the present disclosure can promote the bypass function or the bypass seamless switching function of the bypass switch module S to operate normally by reasonable/appropriate arrangement condition of the first driving power supply 24, the first relay R1 (such as a normally closed relay) and the second relay R2 (such as a normally open relay).

In addition, one important design of FIG. 1A to FIG. 1B of the present disclosure is as following: the driving voltage VL (such as 12 V) of the driving signal C of the first driving power supply 24 needs to be less than the maximum value (such as 15 V) of the driving voltage VH of the first switch signal F1 amplified by the controller 10 via the driver 23, so as to protect the driver 23 from being damaged by the reverse feed of the driving voltage VL of the first driving power supply 24, that is, to prevent the energy of the driver 23 from being damaged by the reverse feed of the driving voltage VL of the driving signal C of the first driving power supply 24. Meanwhile, the one way first diode D1 (only allowing current to flow from the anode to the cathode) may be disposed between the switch B1 of the first relay R1 connected to the first driving power supply 24 and the driver 23 (the switch B2 of the second relay R2), so that the conduction direction of the driving signal C of the first driving power supply 24 and the conduction direction of the first switch signal F1 of the driver 23 are controlled (limited) by the one way first diode D1 to steer to the bypass switch module S (such as the coil A3 of the relay).

Figure 3A:
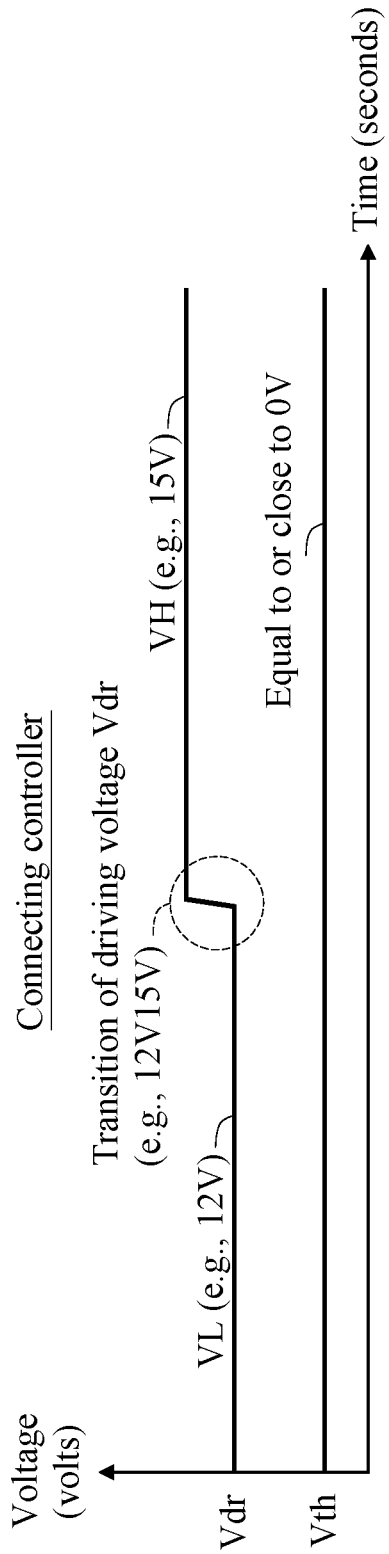
FIG. 3A to FIG. 3B are schematic diagrams of the transition state of the driving voltage and the waveform of the bypass side voltage when the controller is connected and disconnected respectively in the bypass seamless switching apparatus and method thereof according to the present disclosure.
Figure 3B:
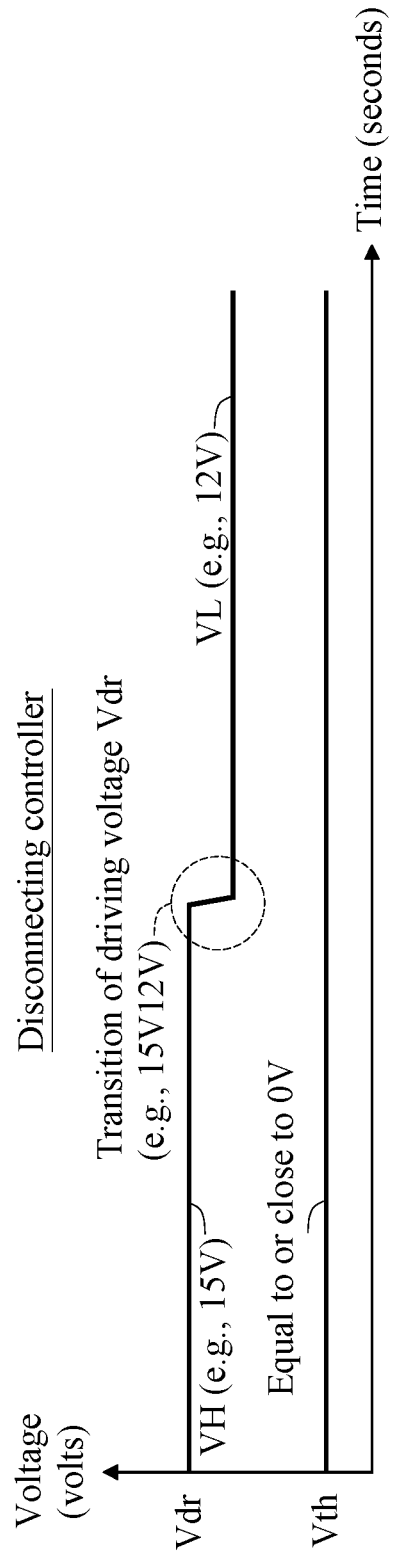

FIG. 3A to FIG. 3B are schematic diagrams of the transition state of the driving voltage Vdr and the waveform of the bypass side voltage Vth when the controller 10 is connected and disconnected respectively in the bypass seamless switching apparatus 1 and method thereof according to the present disclosure, and FIG. 3A and FIG. 3B are illustrated with reference to FIG. 1A to FIG. 1B.

As shown in FIG. 3A to FIG. 3B, the present disclosure sets the test scenario of the bypass seamless switching apparatus 1 as: confirming the activation and disconnection of the bypass function (bypass seamless switching function) of the bypass switch module S. Assume that the driving voltage VL of the driving signal C output by the first driving power supply 24 is set to, for example, 12 V (volts), and the maximum value of the driving voltage VH of the first switch signal F1 output by the driver 23 is set to, for example, 15 V (volts), according to which the bypass seamless switching apparatus 1 is actually verified whether the bypass switch module S can keep on seamless switching when switching between the driving signal C of the first driving power supply 24 and the first switch signal F1 of the driver 23, and the judging of seamless switching is based on whether the bypass side voltage Vth of the bypass switch module S (such as the voltage at both ends of the switch B3 of the relay) can be kept at or close to zero voltage (0 V) state.

As shown in FIG. 1A and FIG. 3A, when the controller 10 is in the control mode or connected to the bypass circuit 20, main control of the driving voltage Vdr (driving signal) of the bypass switch module S (such as both ends of the coil A3) is transferred from the first driving power supply 24 to the controller 10 or the driver 23, that is, the controller 10 sends the first switch signal F1 to the bypass switch module S (such as both ends of the coil A3) via the driver 23. As a result of the transfer experiment verified by practice, the driving voltage Vdr (driving signal) of the bypass switch module S (such as both ends of the coil A3) is transited from being equal to the driving voltage VL (such as 12 V) of the first driving power supply 24 to being equal to the driving voltage VH (such as 15 V) of the driver 23, but the bypass side voltage Vth of the bypass switch module S (such as the voltage at both ends of the switch B3 of the relay) has almost no fluctuations and remains equal to or close to zero voltage (0 V) state.

As shown in FIG. 1B and FIG. 3B, when the controller 10 is in failure mode or disconnects the connection relation/connection line between the controller 10 and the bypass circuit 20 (such as a failure or replacement of the controller 10), main control of the driving voltage Vdr (driving signal) of the bypass switch module S (such as both ends of the coil A3) is transferred from the controller 10 or the driver 23 to the first driving power supply 24, that is, the first driving power supply 24 outputs the driving signal C to the bypass switch module S. As a result of the transfer experiment verified by practice, the driving voltage Vdr of the bypass switch module S (such as both ends of the coil A3) is transited from being equal to the driving voltage VH (such as 15 V) of the driver 23 to being equal to the driving voltage VL (such as 12 V) of the first driving power supply 24, but the bypass side voltage Vth of the bypass switch module S (such as the voltage at both ends of the switch B3 of the relay) has almost no fluctuation and remains equal to or close to zero voltage (0 V) state.

Therefore, the present disclosure can verify the bypass seamless switching apparatus 1 and feasibility of the method thereof via the transfer experiment results of the two different states of the "connecting controller 10" shown in FIG. 3A and the "disconnecting controller 10" shown in FIG. 3B, and the bypass side voltage Vth of the bypass switch module S can be kept equal to or close to zero voltage (0 V) no matter in the state of "connecting controller 10" or "disconnecting controller 10," so that the bypass switch module S keeps in the short-circuit state or the short-circuit protection state to effectively achieve the bypass function or the bypass seamless switching function.

Figure 4:
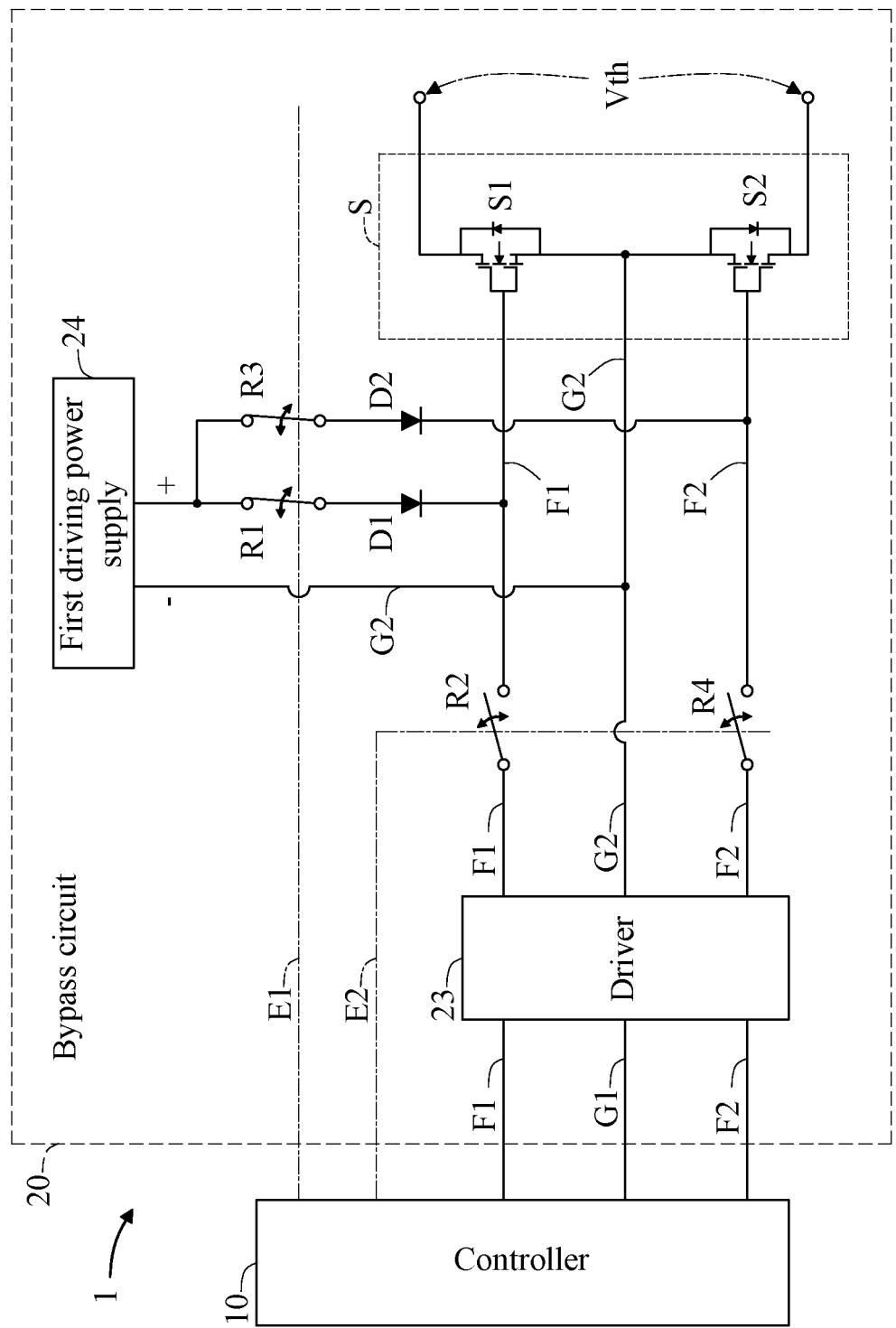
FIG. 4 is a schematic diagram of the circuit structure of the second embodiment of the bypass seamless switching apparatus according to the present disclosure.

FIG. 4 is a schematic diagram of the circuit structure of the second embodiment of the bypass seamless switching apparatus 1 according to the present disclosure, and the first toggle switch S1 and the second toggle switch S2 can form a common-source type or common-ground type bypass switch module S. Meanwhile, the technical contents of the bypass seamless switching apparatus 1 of FIG. 4 and the above FIG. 1A (FIG. 1B) are roughly the same, so the similarities of the bypass seamless switching apparatus 1 of FIG. 4 and FIG. 1A (FIG. 1B) will not be repeated, and the main difference between the two bypass seamless switching apparatuses 1 is described below.

As shown in FIG. 4, the bypass circuit 20 of the bypass seamless switching apparatus 1 not only has a driver 23, a first driving power supply 24, a first relay R1, a second relay R2, a first diode D1 and a bypass switch module S in FIG. 1A to FIG. 1B, but also has a first signal amplifier 21 and a second signal amplifier 22 (not shown in FIG. 4) in FIG. 1A to FIG. 1B, and the bypass circuit 20 can also have a third relay R3, a fourth relay R4 and a second diode D2.

The controller 10 can be electrically connected to the driver 23 of the bypass circuit 20, the first relay R1, the second relay R2, the third relay R3 and the fourth relay R4. The driver 23 can be electrically connected to the negative terminal (−) of the first driving power supply 24, the second relay R2, the fourth relay R4 and the bypass switch module S. The first driving power supply 24 can be electrically connected to the driver 23, the first relay R1, the third relay R3 and the bypass switch module S.

For example, the first driving power supply 24 can provide a driving signal C (such as a DC voltage driving signal) to the bypass switch module S, and the positive terminal (+) of the first driving power supply 24 can be electrically connected to the first relay R1 and the third relay R3 respectively, and the negative terminal (−) of the first driving power supply 24 can be electrically connected to the ground terminal of the driver 23, a source of the first toggle switch S1 and a source of the second toggle switch S2 of the bypass switch module S via a second ground line G2.

Both the first relay R1 and the third relay R3 can be normally closed relays composed of coils and switches, the first relay R1 can be electrically connected to the positive terminal (+) of the first driving power supply 24 and the anode of the first diode D1, the cathode of the first diode D1 can be electrically connected to the second relay R2 and the gate of the first toggle switch S1 of the bypass switch module S, the third relay R3 can be electrically connected to the positive terminal (+) of the first driving power supply 24 and the anode of the second diode D2, and the cathode of the second diode D2 can be electrically connected to the fourth relay R4 and the gate of the second toggle switch S2 of the bypass switch module S. Also, both the second relay R2 and the fourth relay R4 can be normally open relays composed of coils and switches, the second relay R2 can be electrically connected to the driver 23 and the gate of the first toggle switch S1 of the bypass switch module S, and the fourth relay R4 can be electrically connected to the driver 23 and the gate of the second toggle switch S2 of the bypass switch module S.

The controller 10 can be electrically or communicatively connected to the bypass circuit 20 via a plurality of lines or signals, for example: [1] the controller 10 can be electrically or communicatively connected to the first relay R1 and the third relay R3 (such as a normally closed relay) of the bypass circuit 20 via the first control line or the first control signal E1, so that the first control signal E1 is used to synchronously control or switch the switches of the first relay R1 and the third relay R3 to on state or off state. [2] The controller 10 can be electrically or communicatively connected to the second relay R2 and the fourth relay R4 (such as a normally open relay) of the bypass circuit 20 via the second control line or the second control signal E2, so that the second control signal E2 is used to synchronously control or switch the switches of the second relay R2 and the fourth relay R4 to on state or off state. [3] The controller 10 can be communicatively connected to the driver 23 of the bypass circuit 20, the second relay R2, and the gate of the first toggle switch S1 of the bypass switch module S via the first switch signal F1 in sequence, so as to control or switch the first toggle switch S1 of the bypass switch module S to on state or off state by the first switch signal F1. [4] The controller can be communicatively connected to the driver 23 of the bypass circuit 20, the fourth relay R4, and the gate of the second toggle switch S2 of the bypass switch module S via the second switch signal F2 in sequence, so as to control or switch the second toggle switch S2 of the bypass switch module S to on state or off state by the second switch signal F2.

Moreover, the controller 10 can be electrically connected to one ground terminal of the driver 23 via the first ground line G1, and the other ground terminal of the driver 23 can be electrically connected to the sources of the first toggle switch S1 and the second toggle switch S2 of the bypass switch module S via the second ground line G2, so that the first toggle switch S1 and the second toggle switch S2 form a common-source type or common-ground type bypass switch module S (such as bypass bidirectional switch). That is, the bypass switch module S can be a bypass bidirectional switch or a high-frequency switching element composed of the first toggle switch S1 and the second toggle switch S2, and the sources of the first toggle switch S1 and the second toggle switch S2 can both be connected to the second ground line G2, so that the first toggle switch S1 and the second toggle switch S2 form a common-source type or common-ground type bypass switch module S. For example, the first toggle switch S1 or the second toggle switch S2 can be a hybrid toggle switch, an active switch, a high-frequency switching element, an insulated gate bipolar transistor (IGBT), a metal-oxide-semiconductor field effect transistor (MOSFET), wide band gap (WBG) toggle switch (such as WBG MOSFET), etc.

In addition, one important design of the bypass seamless switching apparatus 1 in FIG. 4 of the present disclosure is as following: the driving voltage VL (such as 12 V) of the driving signal C (as shown in FIG. 1A) of the first driving power supply 24 needs to be less than the maximum value (such as 15 V) of the driving voltage VH of the first switch signal F1 amplified by the controller 10 via the driver 23, so as to protect the driver 23 from being damaged by the reverse feed of the driving voltage VL of the first driving power supply 24, that is, to prevent the energy of the driver 23 from being damaged by the reverse feed of the driving voltage VL of the driving signal C of the first driving power supply 24. Meanwhile, the one way first diode D1 (only allowing current to flow from the anode to the cathode) may be disposed between the first relay R1 connected to the first driving power supply 24 and the driver 23 (the second relay R2), so that the conduction direction of the driving signal C of the first driving power supply 24 and the conduction direction of the first switch signal F1 of the driver 23 are controlled (limited) by the one way first diode D1 to steer merely to the first toggle switch S1 of the bypass switch module S. Moreover, the one way second diode D2 (only allowing current to flow from the anode to the cathode) may be disposed between the third relay R3 connected to the first driving power supply 24 and the driver 23 (the fourth relay R4), so that the conduction direction of the driving signal C of the first driving power supply 24 and the conduction direction of the second switch signal F2 of the driver 23 are controlled (limited) by the one way second diode D2 to steer merely to the second toggle switch S2 of the bypass switch module S.

Figure 5:
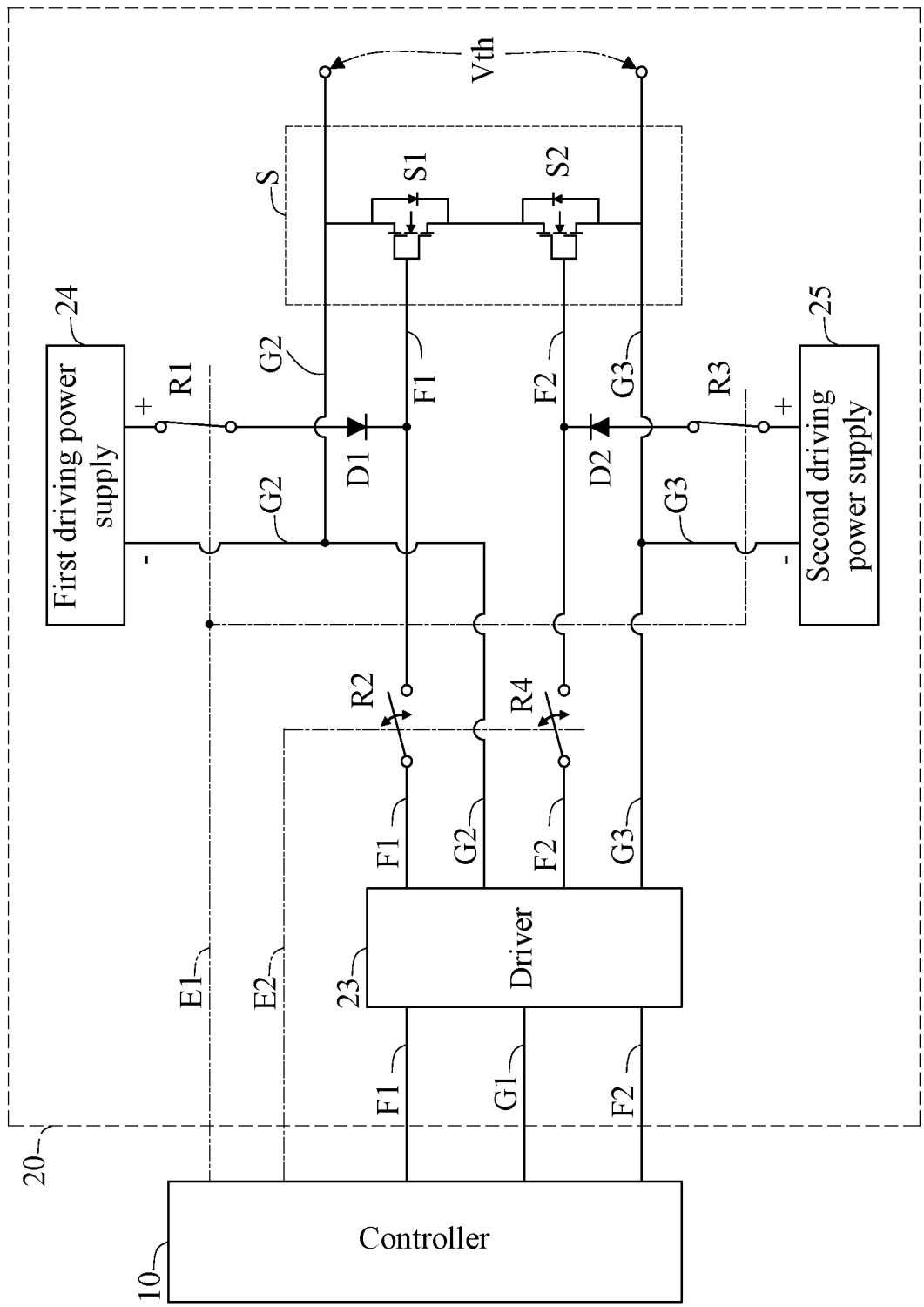
FIG. 5 is a schematic diagram of the circuit structure of the third embodiment of the bypass seamless switching apparatus according to the present disclosure.

FIG. 5 is a schematic diagram of the circuit structure of the third embodiment of the bypass seamless switching apparatus 1 according to the present disclosure, and the first toggle switch S1 and the second toggle switch S2 can form a common-drain type or a non-common-ground type bypass switch module S. Meanwhile, the technical contents of the bypass seamless switching apparatus 1 of FIG. 5 and the above FIG. 1A (FIG. 1B) are roughly the same, so the similarities of the bypass seamless switching apparatus 1 of FIG. 5 and FIG. 1A (FIG. 1B) will not be repeated, and the main difference between the two bypass seamless switching apparatuses 1 is described below.

As shown in FIG. 5, the bypass circuit 20 of the bypass seamless switching apparatus 1 not only has a driver 23, a first driving power supply 24, a first relay R1, a second relay R2, a first diode D1 and a bypass switch module S in FIG. 1A to FIG. 1B, but also has a first signal amplifier 21 and a second signal amplifier 22 (not shown in FIG. 5) in FIG. 1A to FIG. 1B, and the bypass circuit 20 can also have a third relay R3, a fourth relay R4, a second diode D2 and a second driving power supply 25.

The controller 10 can be electrically connected to the driver 23, the first relay R1, the second relay R2, the third relay R3 and the fourth relay R4 of the bypass circuit 20. The driver 23 can be electrically connected to the second relay R2 and the fourth relay R4, the driver 23 can also be electrically connected to the negative terminal (−) of the first driving power supply 24 and the first toggle switch S1 of the bypass switch module S respectively via the second ground line G2, and the driver 23 can also be electrically connected to the negative terminal (−) of the second driving power supply 25 and the second toggle switch S2 of the bypass switch module S respectively via the third ground line G3. The first driving power supply 24 can be electrically connected to the driver 23, the first relay R1 and the first toggle switch S1 of the bypass switch module S, and the second driving power supply 25 can be electrically connected to the driver 23, the third relay R3 and the second toggle switch S2 of the bypass switch module S.

For example, the first driving power supply 24 can provide a driving signal C (see FIG. 1A) to the bypass switch module S. The positive terminal (+) of the first driving power supply 24 can be electrically connected to the first relay R1, and the negative terminal (−) of the first driving power supply 24 can be electrically connected to the ground terminal of the driver 23 and a source of the first toggle switch S1 of the bypass switch module S via the second ground line G2. The positive terminal (+) of the second driving power supply 25 can be electrically connected to the third relay R3, and the negative terminal (−) of the second driving power supply 25 can be electrically connected to the ground terminal of the driver 23 and the source of the second toggle switch S2 of the bypass switch module S via the third ground line G3.

Both the first relay R1 and the third relay R3 can be normally closed relays composed of coils and switches, the first relay R1 can be electrically connected to the positive terminal (+) of the first driving power supply 24 and the anode of the first diode D1, the cathode of the first diode D1 can be electrically connected to the second relay R2 and the gate of the first toggle switch S1 of the bypass switch module S, the third relay R3 can be electrically connected to the positive terminal (+) of the second driving power supply 25 and the anode of the second diode D2, and the cathode of the second diode D2 can be electrically connected to the fourth relay R4 and the gate of the second toggle switch S2 of the bypass switch module S. Also, both the second relay R2 and the fourth relay R4 can be normally open relays composed of coils and switches, the second relay R2 can be electrically connected to the driver 23 and the gate of the first toggle switch S1 of the bypass switch module S, and the fourth relay R4 can be electrically connected to the driver 23 and the gate of the second toggle switch S2 of the bypass switch module S.

The controller 10 can be electrically or communicatively connected to the bypass circuit 20 via a plurality of lines or signals, for example: [1] the controller 10 can be electrically or communicatively connected to the first relay R1 and the third relay R3 (such as a normally closed relay) of the bypass circuit 20 via the first control line or the first control signal E1, so that the first control signal E1 is used to synchronously control or switch the switches of the first relay R1 and the third relay R3 to on state or off state. [2] The controller 10 can be electrically or communicatively connected to the second relay R2 and the fourth relay R4 (such as a normally open relay) of the bypass circuit 20 via the second control line or the second control signal E2, so that the second control signal E2 is used to synchronously control or switch the switch B2 of the second relay R2 and the fourth relay R4 to on state or off state. [3] The controller 10 can be communicatively connected to the driver 23, the second relay R2 and the gate of the first toggle switch S1 of the bypass switch module S of the bypass circuit 20 via the first switch signal F1 in sequence, so as to control or switch the first toggle switch S1 of the bypass switch module S to on state or off state by the first switch signal F1. [4] The controller can be communicatively connected to the driver 23, the fourth relay R4 and the gate of the second toggle switch S2 of the bypass switch module S of the bypass circuit 20 via the second switch signal F2 in sequence, so as to control or switch the second toggle switch S2 of the bypass switch module S to on state or off state by the second switch signal F2.

The controller 10 can be electrically connected to one ground terminal of the driver 23 via the first ground line G1. The other ground terminal of the driver 23 can be electrically connected to the source of the first toggle switch S1 of the bypass switch module S via the second ground line G2, and the yet another ground terminal of the driver 23 can be electrically connected to the source of the second toggle switch S2 of the bypass switch module S via the third ground line G3. The drains of the first toggle switch S1 and the second toggle switch S2 are connected with each other, so that the first toggle switch S1 and the second toggle switch S2 form a common-drain type or non-common-ground type bypass switch module S. That is, the bypass switch module S can be a bypass bidirectional switch or a high-frequency switching element composed of the first toggle switch S1 and the second toggle switch S2, and the drains of the first toggle switch S1 and the second toggle switch S2 can both be connected to each other, so that the first toggle switch S1 and the second toggle switch S2 form a common-drain type or non-common-ground type bypass switch module S.

In addition, one important design of the bypass seamless switching apparatus 1 in FIG. 5 of the present disclosure is as following: the driving voltage VL (such as 12 V) of the driving signal C (as shown in FIG. 1A) of the first driving power supply 24 needs to be less than the maximum value (such as 15 V) of the driving voltage VH of the first switch signal F1 amplified by the controller 10 via the driver 23, so as to protect the driver 23 from being damaged by the reverse feed of the driving voltage VL of the first driving power supply 24, that is, to prevent the energy of the driver 23 from being damaged by the reverse feed of the driving voltage VL of the driving signal C of the first driving power supply 24. Meanwhile, the one way first diode D1 (only allowing current to flow from the anode to the cathode) may be disposed between the first relay R1 connected to the first driving power supply 24 and the driver 23 (the second relay R2), so that the conduction direction of the driving signal C of the first driving power supply 24 and the conduction direction of the first switch signal F1 of the driver 23 are controlled (limited) by the one way first diode D1 to steer merely to the first toggle switch S1 of the bypass switch module S. Moreover, the one way second diode D2 (only allowing current to flow from the anode to the cathode) may be disposed between the third relay R3 connected to the second driving power supply 25 and the driver 23 (the fourth relay R4), so that the conduction direction of the driving signal (not shown) of the second driving power supply 25 and the conduction direction of the second switch signal F2 of the driver 23 are controlled (limited) by the one way second diode D2 to steer merely to the second toggle switch S2 of the bypass switch module S.

Figure 6A:
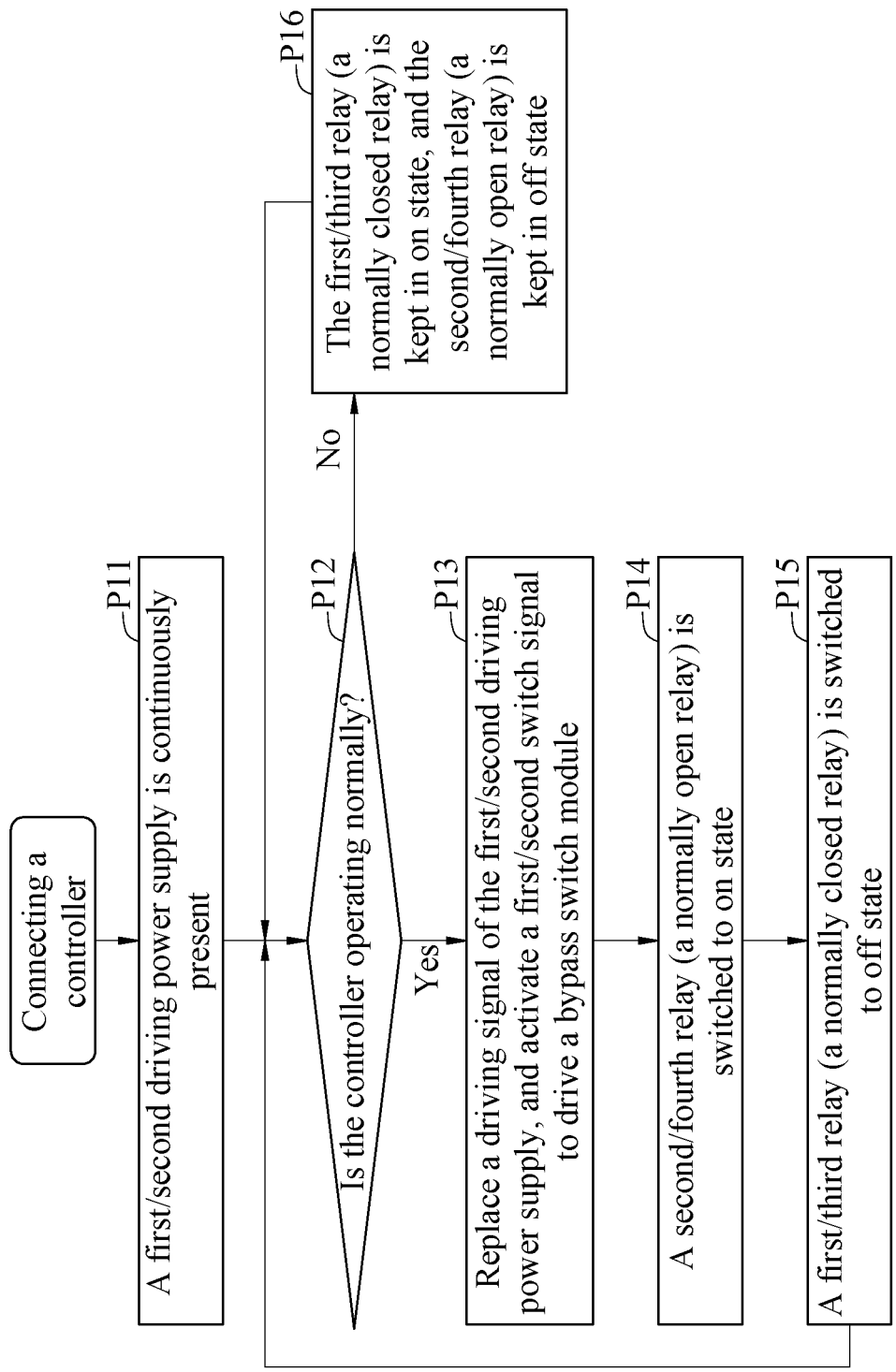
FIG. 6A is a flowchart of connecting controller (startup procedure) in the bypass seamless switching apparatus and method thereof according to the present disclosure.

FIG. 6A is a flowchart of connecting controller 10 (startup procedure) in the bypass seamless switching apparatus 1 and method thereof according to the present disclosure, and FIG. 6A is illustrated with reference to FIG. 1A to FIG. 2 and FIG. 4 to FIG. 5. As shown in FIG. 6A, the process of connecting the controller 10 (startup procedure) may comprise the following steps P11 to P16.

In step P11 to step P12, the first driving power supply 24 (or with the second driving power supply 25) is continuously present, so as to determine whether the controller 10 is operating normally. If yes (the controller 10 is operating normally), proceed to step P13 to step P15 in sequence. On the contrary, if no (the controller 10 is not operating normally), proceed to step P16.

In step P13 to step P15, when the controller 10 is operating normally, instead of the driving signal C of the first driving power supply 24 (or with the second driving power supply 25), startups with the first switch signal F1 (or with a second switch signal F2) of the controller (the driver 23) to drive the bypass switch module S. Then, switch the normally open second relay R2 (or with the fourth relay R4) to the on state, and switch the normally closed first relay R1 (or with the third relay R3) to off state.

In step P16, when the controller 10 is not operating normally (such as in abnormality or failure), the normally closed first relay R1 (or with the third relay R3) is kept in on state, and the normally open second relay R2 (or with the fourth relay R4) is kept in off state.

Figure 6B:
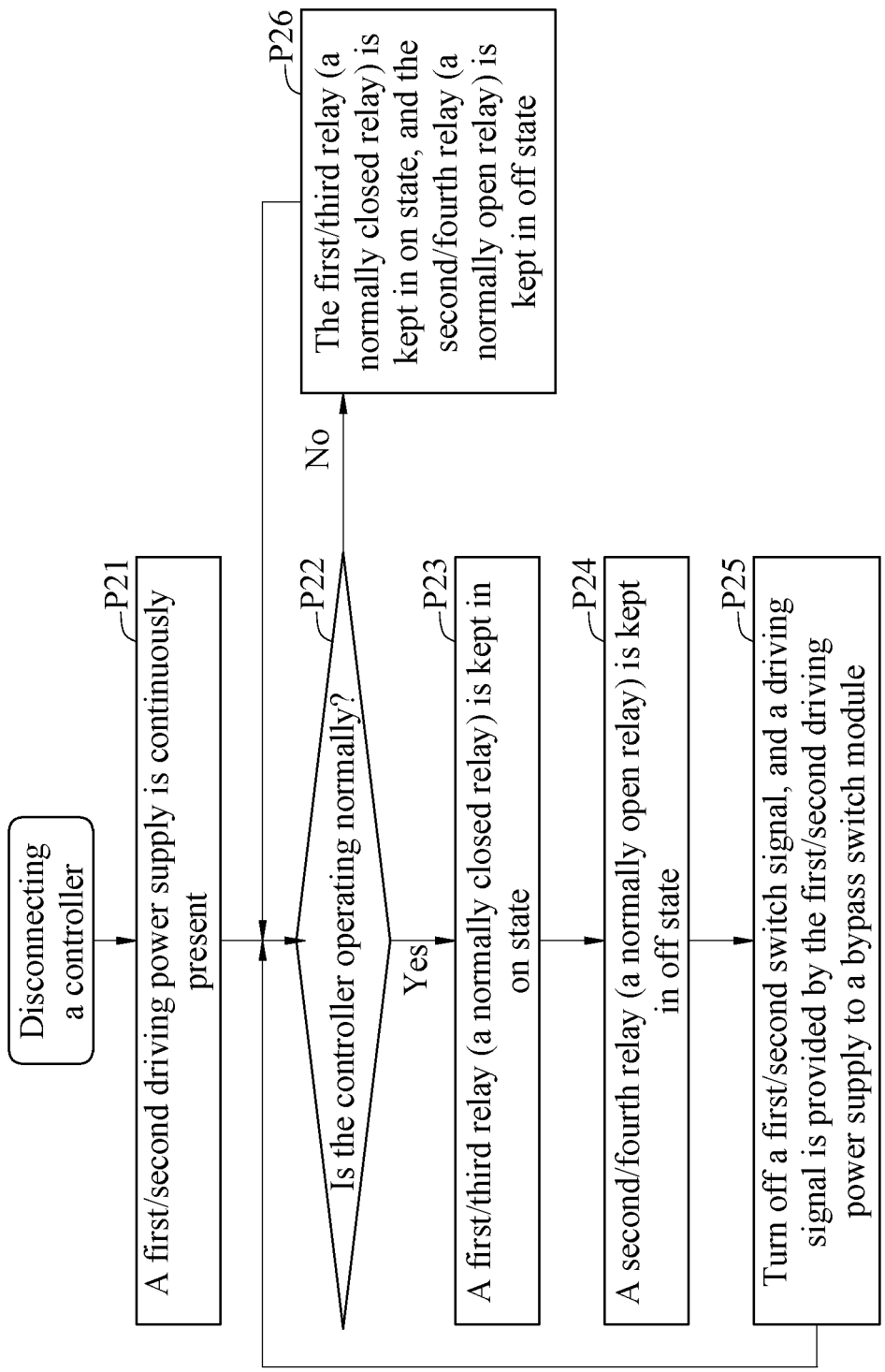
FIG. 6B is a flowchart of disconnecting the controller (closing procedure) in the bypass seamless switching apparatus and method thereof according to the present disclosure.

FIG. 6B is a flowchart of disconnecting the controller 10 (closing procedure) in the bypass seamless switching apparatus 1 and method thereof according to the present disclosure, and FIG. 6B is illustrated with reference to FIG. 1A to FIG. 2 and FIG. 4 to FIG. 5. As shown in FIG. 6B, the process of disconnecting the controller 10 (closing procedure) may comprise the following step P21 to step P26.

In step P21 to step P22, the first driving power supply 24 (or with the second driving power supply 25) is continuously present, so as to determine whether the controller 10 is operating normally. If yes (the controller 10 is operating normally), proceed to step P23 to step P25 in sequence. On the contrary, if no (the controller 10 is not operating normally), proceed to step P26.

In step P23 to step P25, when the controller 10 is operating normally, the normally closed first relay R1 (or with the third relay R3) is kept in on state, and the normally open second relay R2 (or with the fourth relay R4) is kept in off state. Then, the first switch signal F1 (or with the second switch signal F2) is turned off, so that the driving signal C is provided by the first driving power supply 24 (or with the second driving power supply 25) to drive the bypass switch module S.

In step P26, when the controller 10 is not operating normally (such as in abnormality or failure), the normally closed first relay R1 (or with the third relay R3) is kept in on state, and the normally open second relay R2 (or with the fourth relay R4) is kept in off state.

Figure 7:
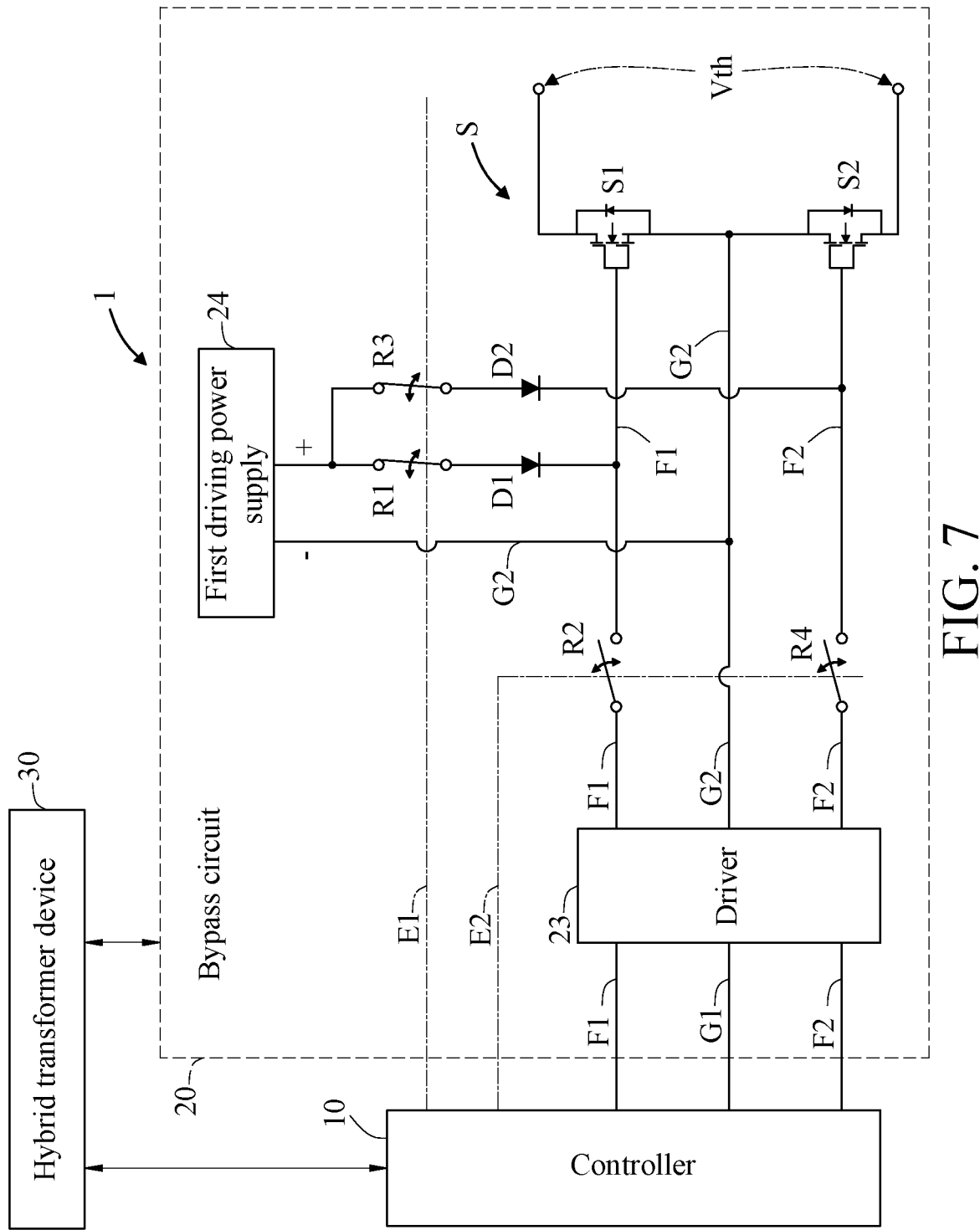
FIG. 7 is a schematic diagram of an application example of the bypass seamless switching apparatus according to the present disclosure.

FIG. 7 is a schematic diagram of an application example of the bypass seamless switching apparatus 1 according to the present disclosure, and the second embodiment of FIG. 4 is used to illustrate the following. Further, the first embodiment of FIG. 1A (FIG. 1B) and the third embodiment of FIG. 5 can also be applied, for example, the first toggle switch S1 and the second toggle switch S2 in FIG. 4 are replaced with the relay with the coil A3 and the switch B3 as in FIG. 1A, etc., which will not be described again here.

As shown in FIG. 7, the bypass seamless switching apparatus 1 in FIG. 4 can be installed or connected to a hybrid transformer device 30, a general transformer, a power electronic module, an electronic switch, a series compensation system, a power system, or a power transmission and distribution system, etc., but not limited to the above. For example, the technical content of the hybrid transformer device 30 can refer to the detailed description of the "hybrid transformer device and control method thereof" described in the applicant's Taiwan Patent Application No. TW111135384 on Sep. 19, 2022, and will not be described again here.

For example, both the bypass seamless switching apparatus 1 and the hybrid transformer device 30 can use the same controller 10, the first toggle switch S1 (such as the first hybrid toggle switch) and the second toggle switch S2 (such as the second hybrid toggle switch), and the controller 10 can control the first toggle switch to the fourth toggle switch (not shown in FIG. 7) of the hybrid transformer device 30, and can also control the first toggle switch S1 of the bypass switch module S (such as the first hybrid toggle switch) and the second toggle switch S2 (such as the second hybrid toggle switch), so that the hybrid transformer device 30 can switch between the normal operation mode and the bypass mode. When the hybrid transformer device 30 is switched to the normal operation mode, the controller 10 can switch the first toggle switch S1 and the second toggle switch S2 of the bypass switch module S to off state. When the hybrid transformer device 30 is switched to the bypass mode, the controller 10 can switch the first toggle switch S1 and the second toggle switch S2 of the bypass switch module S to the on state, so that the bypass switch module S is kept in a short-circuit state or a short-circuit protection state to perform a bypass function or a bypass seamless switching function.

In view of the above, the bypass seamless switching apparatus and method thereof according to the present disclosure have at least the following features, advantages, or technical effects:

1. The bypass switch module in the present disclosure can also automatically operate a protection without a controller (such as the controller is in failure mode or disconnects the connection relation/connection line between the controller and the bypass circuit), which facilitate convenience of replacing the controller, and also enables the controller to have a certain hot-swap capability.
2. The controller of the present disclosure can send the first control signal to effectively control or switch the switch of the first relay to on state or off state, and can send the second control signal to effectively control or switch the switch of the second relay to on state or off state, and can also send a switch signal to effectively control or switch the switch of the bypass switch module to on state or off state.
3. When the controller of the present disclosure is in the control mode or connected to the bypass circuit, the controller can send a first control signal (such as a digital control signal) to effectively control or switch the first relay (such as a normally closed relay) of the bypass circuit to on state or off state, and can also send a second control signal (such as a second digital control signal) to effectively control or switch the second relay (such as a normally open relay) of the bypass circuit to on state or off state.
4. When the controller of the present disclosure is in the control mode or connected to the bypass circuit, the controller can send the first switch signal (such as the driving signal/toggle switch signal) to effectively drive or switch the bypass switch module to on state or off state via the driver of the bypass circuit, and then the bypass function or the bypass seamless switching function of the bypass switch module is turned on or off.
5. When the controller of the present disclosure is in failure mode or disconnects the connection relation/connection line between the controller and the bypass circuit, the first driving power supply of the bypass circuit can still continuously provide a driving signal to the bypass switch module to drive the switch of the bypass switch module to keep in on state, so that the bypass switch module is in a short-circuit state or a short-circuit protection state, and the bypass side voltage of the bypass switch module is equal to or close to zero voltage, so as to facilitate achieving the bypass function or the bypass seamless switching function of the bypass switch module and also facilitate replacing or hot-swapping the controller connected to the bypass circuit (such as a modular controller).
6. When the controller of the present disclosure is in failure mode or disconnects the connection relation/connection line between the controller and the bypass circuit (such as replacing/hot-swapping the controller), the normally closed first relay can return to on state, and the normally open second relay can jump to off state, so as to provide a driving signal to the bypass switch module from the first driving power supply, so that the bypass switch module is kept in a short-circuit state or a short-circuit protection state, and the bypass side voltage of the bypass switch module is always kept equal to or close to zero voltage, which facilitates achieving the bypass function or bypass seamless switching function of the bypass switch module.
7. With the reasonable/appropriate arrangement of the first driving power supply of the bypass circuit, the switch of the normally closed first relay, and the switch of the normally open second relay, the present disclosure enables the bypass switch module to be effectively kept in the short-circuit state or the short-circuit protection state without a controller (such as replacing/hot-swapping the controller), and can also promote the normal operation of the bypass function or the bypass seamless switching function of the bypass switch module.
8. The driving voltage of the driving signal of the first/second driving power supply of the present disclosure is less than the maximum value of the driving voltage of the first/second switch signal amplified by the controller via the driver, so as to protect the driver from being damaged by the reverse feed of the driving voltage of the first/second driving power supply, that is, to prevent the energy of the driver from being damaged by the reverse feed of the driving voltage of the driving signal of the first/second driving power supply.

9. A one way first diode (only allowing current to flow from the anode to the cathode) can be provided between the first relay connected to the first driving power supply and the driver (second relay) of the present disclosure, so that the conduction direction of the driving signal of the first driving power supply and the conduction direction of the first switch signal of the driver are controlled (limited) by the one way first diode to steer to the bypass switch module.

The above embodiments are provided for illustrating the principles of the present disclosure and its technical effect, and should not be construed as to limit the present disclosure in any way. The above embodiments can be modified by one of ordinary skill in the art without departing from the spirit and scope of the present disclosure. Any equivalent changes and modifications accomplished using the content disclosed in the present disclosure should still be covered by the scope of the claims. Therefore, the scope claimed of the present disclosure should be defined by the following claims.

What is claimed is:

1. A bypass seamless switching apparatus, comprising:
a controller; and
a bypass circuit electrically connected to the controller and having a first driving power supply, a first relay, a second relay and a bypass switch module, wherein the first driving power supply is electrically connected to the first relay and the bypass switch module respectively, and the second relay is electrically connected to the bypass switch module, so that the controller sends a first control signal to control or switch a switch of the first relay to on state or off state, the controller sends a second control signal to control or switch a switch of the second relay to on state or off state, and the controller sends a switch signal to control or switch a switch of the bypass switch module to on state or off state;
wherein the first driving power supply of the bypass circuit provides a driving signal to the bypass switch module to maintain or switch the switch of the bypass switch module to on state when the controller is in a failure mode or disconnects a connection relation/connection line between the controller and the bypass circuit, so that the bypass switch module is in a short-circuit state or a short-circuit protection state, and a bypass side voltage of the bypass switch module is equal to or close to zero voltage to turn on or execute a bypass function or a bypass seamless switching function of the bypass switch module.

2. The bypass seamless switching apparatus of claim 1, wherein the bypass circuit further has a first signal amplifier and a second signal amplifier, the first signal amplifier is electrically connected to the controller and the first relay respectively, and the second signal amplifier is electrically connected to the controller and the second relay respectively, wherein the first signal amplifier amplifies the first control signal of the controller to control or switch the switch of the first relay to on state or off state, and the second signal amplifier amplifies the second control signal of the controller to control or switch the switch of the second relay to on state or off state.

3. The bypass seamless switching apparatus of claim 1, wherein the bypass circuit further has a first signal amplifier, a second signal amplifier and a driver, the controller is electrically connected to a ground terminal of the first signal amplifier and a ground terminal of the driver via a first ground line, and the first signal amplifier is electrically connected to a ground terminal of a coil of the first relay via the first ground line, the second signal amplifier is electrically connected to a ground terminal of a coil of the second relay via a second ground line, and the driver is electrically connected to the bypass switch module via the second ground line.

4. The bypass seamless switching apparatus of claim 1, wherein the bypass circuit further has a driver electrically connected to the controller and the bypass switch module respectively, so that the driver amplifies the switch signal of the controller, and then uses the amplified switch signal to control or switch the switch of the bypass switch module to on state or off state.

5. The bypass seamless switching apparatus of claim 1, wherein the bypass circuit further has a driver electrically connected to the second relay and the bypass switch module respectively, and a driving voltage of the driving signal of the first driving power supply is less than a maximum value of the driving voltage amplified by the controller via the driver, so as to protect the driver from being damaged by a reverse feed of the driving voltage of the first driving power supply.

6. The bypass seamless switching apparatus of claim 1, wherein the bypass circuit further has a driver, and when the controller is in a control mode or connected to the bypass circuit, the controller sends the first control signal to control or switch the first relay to on state or off state, and sends the second control signal to control or switch the second relay to on state or off state, and sends the switch signal to drive or switch the bypass switch module to on state or off state via the driver, so as to turn on or off the bypass function or the bypass seamless switching function of the bypass switch module.

7. The bypass seamless switching apparatus of claim 1, wherein the bypass circuit further has a driver and a diode, a positive terminal of the first driving power supply is electrically connected to the switch of the first relay, a negative terminal of the first driving power supply is electrically connected to the driver and the bypass switch module, the switch of the first relay is electrically connected to an anode of the diode, and a cathode of the diode is electrically connected to the switch of the second relay and the bypass switch module.

8. The bypass seamless switching apparatus of claim 1, wherein the bypass circuit further has a diode disposed between the first relay and the bypass switch module, the switch of the first relay is electrically connected to an anode of the diode, and a cathode of the diode is electrically connected to the bypass switch module, so that a conduction direction of the driving signal of the first driving power supply is controlled or limited by the diode to steer to the bypass switch module.

9. The bypass seamless switching apparatus of claim 1, wherein the first relay is a normally closed relay, and the second relay is a normally open relay, the first relay returns to on state and the second relay jumps to off state when the controller is in the failure mode or disconnects the connection relation/connection line between the controller and the bypass circuit, the first driving power supply provides the driving signal to the bypass switch module, so that the bypass switch module is kept in the short-circuit state or the short-circuit protection state, and the bypass side voltage of the bypass switch module is kept equal to or close to the zero voltage, so that the bypass switch module achieves the bypass function or the bypass seamless switching function.

10. The bypass seamless switching apparatus of claim 1, wherein the bypass switch module is a common-source type or common-ground type bypass bidirectional switch or a high-frequency switching element composed of a first toggle switch and a second toggle switch, and the bypass circuit further has a driver, a third relay and a fourth relay, the controller is electrically connected to the driver, the first relay, the second relay, the third relay and the fourth relay, the driver is electrically connected to the second relay, the fourth relay and the bypass switch module, and the first driving power supply is electrically connected to the driver, the first relay, the third relay and the bypass switch module.

11. The bypass seamless switching apparatus of claim 1, wherein the bypass switch module is a common-drain type or non-common-ground type bypass bidirectional switch or high-frequency switching element composed of a first toggle switch and a second toggle switch, the bypass circuit further has a driver and a second driving power supply, the first driving power supply is electrically connected to the driver, the first relay and the first toggle switch of the bypass switch module, and the second driving power supply is electrically connected to the driver and the second toggle switch of the bypass switch module.

12. A method of bypass seamless switching, comprising:
providing a bypass seamless switching apparatus comprising a controller and a bypass circuit electrically connected to each other, wherein the bypass circuit has a first driving power supply, a first relay, a second relay and a bypass switch module, wherein the first driving power supply is electrically connected to the first relay and the bypass switch module respectively, and the second relay is electrically connected to the bypass switch module, so that the controller sends a first control signal to control or switch a switch of the first relay to on state or off state, the controller sends a second control signal to control or switch a switch of the second relay to on state or off state, and the controller sends a switch signal to control or switch a switch of the bypass switch module to on state or off state; and
providing, by the first driving power supply of the bypass circuit, a driving signal to the bypass switch module to maintain or switch the switch of the bypass switch module to on state when the controller is in a failure mode or disconnects a connection relation/connection line between the controller and the bypass circuit, so that the bypass switch module is in a short-circuit state or a short-circuit protection state, and a bypass side voltage of the bypass switch module is equal to or close to zero voltage to turn on or execute a bypass function or a bypass seamless switching function of the bypass switch module.

13. The method of claim 12, further comprising keeping the switch of the normally closed first relay in on state and keeping the switch of the normally open second relay in off state when the bypass seamless switching apparatus is in an initial mode and the controller is not yet connected to the bypass circuit, so that the bypass switch module is driven or controlled by the driving signal of the first driving power supply.

14. The method of claim 12, further comprising making the switch signal and the first control signal of the controller at a high level when the bypass seamless switching apparatus is in a first control mode connected to the controller and the controller has been connected to the bypass circuit, and keeping the switch of the normally closed first relay in on state, and keeping the switch of the normally open second relay in off state, so that the bypass switch module is driven or controlled by the driving signal of the first driving power supply.

15. The method of claim 14, further comprising keeping the switch of the normally closed first relay in on state when the bypass seamless switching apparatus is in a second control mode connected to the controller and the controller has been connected to the bypass circuit, so as to switch the switch of the normally open second relay from off state to on state by the second control signal of the controller, and the bypass switch module is driven or controlled by the switch signal of the controller.

16. The method of claim 12, further comprising switching the switch of the normally closed first relay from on state to off state by the first control signal of the controller and switching the switch of the normally open second relay from off state to on state by the second control signal of the controller when the bypass seamless switching apparatus is in a bypass mode and the controller has been connected to the bypass circuit, so as to drive or control the bypass switch module by the switch signal of the controller.

17. The method of claim 12, further comprising keeping the first driving power supply present during a process of disconnecting the controller, and determining whether the controller is operated normally, wherein when the controller is operated normally, the driving signal of the first driving power supply is replaced with the switch signal of the controller to drive the bypass switch module, and the normally closed first relay and the normally open second relay are switched to off state and on state respectively.

18. The method of claim 12, further comprising keeping the first driving power supply on during a process of disconnecting the controller, and determining whether the controller is operated normally, wherein when the controller is operated normally, the normally closed first relay is kept in on state and the normally open second relay is kept in off state, and then the switch signal of the controller is turned off, so that the first driving power supply provides the driving signal to drive the bypass switch module.

19. The method of claim 12, further comprising electrically connecting a driver of the bypass circuit to the second relay and the bypass switch module respectively, wherein a driving voltage of the driving signal of the first driving power supply is less than a maximum value of a driving voltage of the switch signal amplified by the controller via the driver, so as to protect the driver from being damaged by a reverse feed of the driving voltage of the first driving power supply.

20. The method of claim 12, further comprising disposing a diode of the bypass circuit between the first relay and the bypass switch module, and electrically connecting the switch of the first relay to an anode of the diode, and electrically connecting a cathode of the diode to the bypass switch module, so that a conduction direction of the driving signal of the first driving power supply is controlled or limited by the diode to steer to the bypass switch module.

* * * * *